US008866345B1

(12) United States Patent
Wright

(10) Patent No.: US 8,866,345 B1
(45) Date of Patent: Oct. 21, 2014

(54) ELECTRICAL CURRENT MANAGING SYSTEM

(76) Inventor: Shawn P. Wright, Murray, UT (US)

( * ) Notice: Subject to any disclaimer, the term of this patent is extended or adjusted under 35 U.S.C. 154(b) by 697 days.

(21) Appl. No.: 13/134,096

(22) Filed: May 27, 2011

(51) Int. Cl.
*H02H 1/04* (2006.01)

(52) U.S. Cl.
CPC ............ *H02H 1/043* (2013.01); *Y10S 323/908* (2013.01)
USPC ............................................ 307/99; 323/908

(58) Field of Classification Search
CPC ................................ H02H 9/001; H02H 9/002
USPC .............................. 307/99, 135; 323/282–285
See application file for complete search history.

(56) References Cited

U.S. PATENT DOCUMENTS

| 3,935,515 | A | * | 1/1976 | Janycky | 361/159 |
| RE35,220 | E | * | 4/1996 | Johnson | 315/208 |
| 5,519,264 | A | * | 5/1996 | Heyden et al. | 307/125 |
| 5,625,276 | A | * | 4/1997 | Scott et al. | 322/24 |
| 5,920,186 | A | * | 7/1999 | Ninh et al. | 323/303 |
| 6,714,429 | B2 | * | 3/2004 | Phadke | 363/89 |
| 8,264,807 | B2 | * | 9/2012 | Hong et al. | 361/91.5 |
| 2004/0004798 | A1 | * | 1/2004 | Priest | 361/93.1 |
| 2007/0086126 | A1 | * | 4/2007 | Baxter | 361/42 |
| 2008/0049403 | A1 | * | 2/2008 | Holce et al. | 361/752 |

* cited by examiner

*Primary Examiner* — Jared Fureman
*Assistant Examiner* — Joel Barnett
(74) *Attorney, Agent, or Firm* — Albert O. Cota

(57) ABSTRACT

An electronic current managing system (ECMS) (10) that utilizes "phase control" to set the maximum current draw of an output load (28) that can consist of an inductive or a dynamic load. The ECMS (10) features a "soft start" that ramps the electric current from zero to full current over a two second period of time. The "soft start" eliminates high in-rush current or power surges from being applied to a system distribution panel or master breaker, thereby allowing a larger output load (28) than would otherwise be possible. The ECMS (10) includes an SCR (22) that causes a power control relay (20) to close or to open in the event the SCR (22) fails and the output load (28) attempts to stay "on". An example of an ECMS (10) output load (28) is a self regulating cable which has a high in-rush current draw that is approximately three times the rated current per watt.

5 Claims, 1 Drawing Sheet

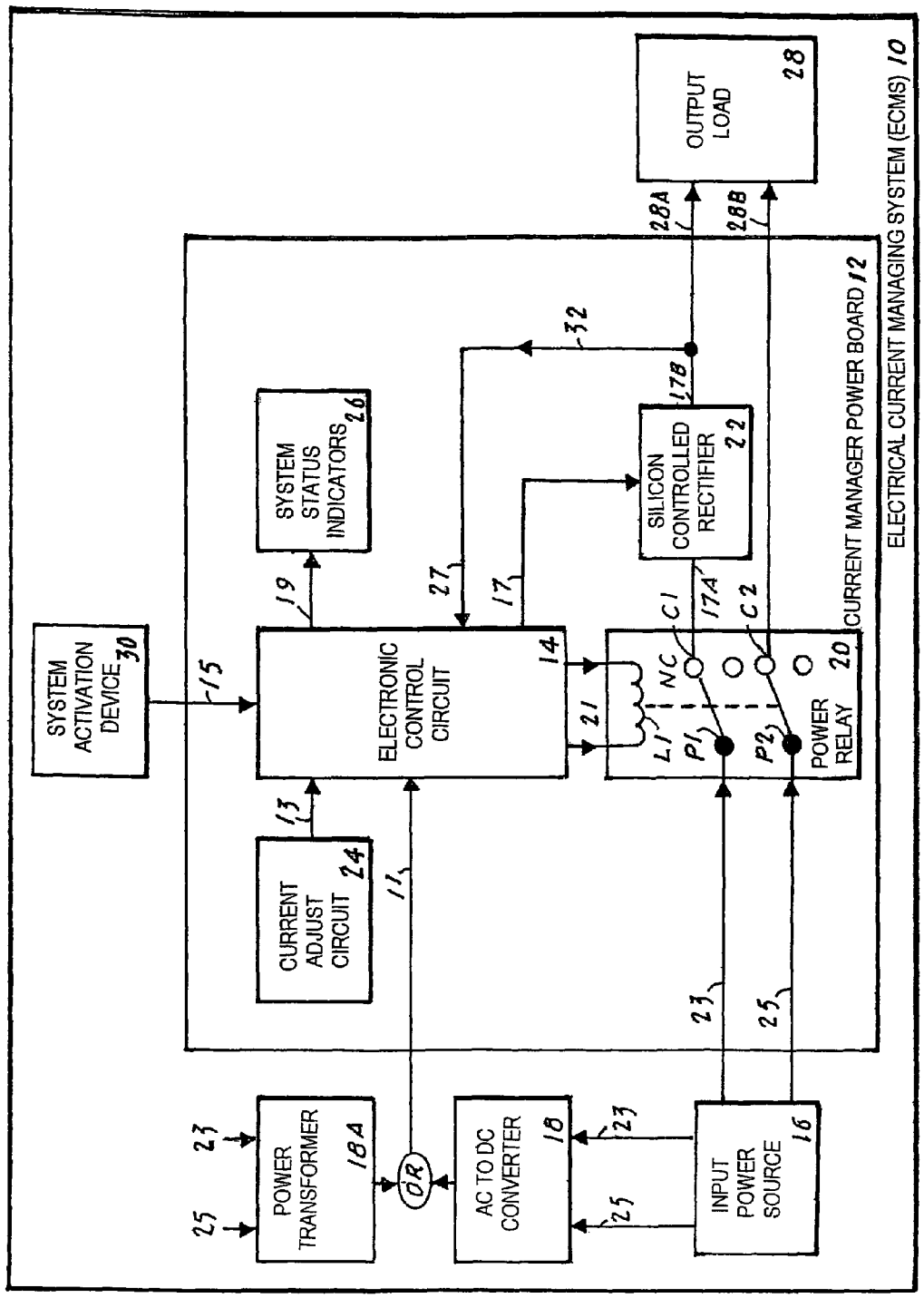

ELECTRICAL CURRENT MANAGING SYSTEM

TECHNICAL FIELD

The invention generally pertains to electrical current control systems, and more particularly to an electrical current managing system (ECMS) that applies a phase controlled, soft current start to an inductive or a dynamic load

BACKGROUND ART

The output load on electronic and electrical circuits is often subjected to a sudden in-rush of current when the circuit is initially turned on. This in-rush of current, can in many cases, cause a circuit output load to open if the circuit is not protected. An example of this potential hazard can be likened to a typical household light bulb dimmer that applies power to the filament of an incondescent light bulb. The dimmer is operated from an "off" position to full brightness over a two to three second time period. This upward-ramped input voltage prevents the initial in-rush of current to be applied to the filament of the light bulb.

Light bulbs seldom fail after they are turned on and have been illuminating over a period of time. Rather they fail when the sudden in-rush of current is applied to the light bulb filament when the light bulb is initially turned "on" by a conventional power switch.

The ECMS solves the above problem by producing an output signal that consists of a maximum voltage that is applied to an output load after a two-second time period has lapsed.

A search of the prior art did not disclose any literature or patents that read directly on the claims of the instant invention.

DISCLOSURE OF THE INVENTION

The electrical current managing system (ECMS) utilizes "phase control" to set a maximum current draw of an inductive and/or a dynamic load In its basic design configuration the ECMS is comprised of:
  A. An electronic control circuit (ECC) having means for controlling the operation of the ECMS,
  B. A system activating device having means for producing a system activation signal,
  C. A power control relay having a first pole that interfaces with a first normally closed contact, a second pole that interfaces with a second normally closed contact, and a coil that is connected to a relay activation signal applied from the ECC,
  D. An input power source that produces an a-c voltage,
  E. An AC to DC converter having an input that is applied the a-c voltage from the input power source, and an output that produces a regulated d-c voltage that is applied to the ECC from where the power is distributed to the elements comprising the ECMS,
  F. An output load having a first input and a second input,
  G. A silicon controlled rectifier (SCR) that is applied an SCR activation signal from the ECC, an SCR input signal applied from the first normally-closed contact on the power control relay, and an SCR output signal that is connected to the first input on the output load. The second input on the output load is applied directly from the second normally-closed contact of the power control relay.

When the system activation signal is applied to the ECC, the ECMS becomes operational, thereby allowing the combination of the ECC and the SCR to produce a phase controlled voltage that ramps upward from zero volts to full power over a two to three second time period. The ramped voltage prevents a sudden in-rush of current to be applied to the output load, conversely when the system activation signal is not applied, the ECC produces a relay activation signal. The relay activation signal is applied to the coil of the power control relay which energizes the relay, allowing the relay contacts to open causing said output load to disconnect.

The ECMS utilizes "phase control" to set the maximum current draw of the inductive and/or dynamic load. The ECMS also features a "soft start" that ramps the output current "on" and "off" from zero to full current over approximately a two second time period. The "soft start" feature eliminates high in-rush of current or power surges from being applied to a system distribution panel or master breaker, thereby allowing a larger load to be installed than would otherwise be possible. The ECMS via the ECC, also utilizes an SCR "fault detection" circuit that opens the power control relay and turns it off in the event the SCR fails or when the ECMS is "off" and the load attempts to stay "on".

The ECMS is designed to operate with an inductive and/or a dynamic load. A typical ECMS load is comprised of a self-regulating cable. These cables have a high in-rush current draw that is approximately three times the rated current per watt. The wattage output and thus the amperage required of these cables increases approximately 25% as the ambient temperature drops from 50 to 0 degrees Fahrenheit. Without the use of the ECMS, the distribution panel breaker and the gauge of electrical conductors must be oversized to handle the in-rush of current necessary for operation, particularly at lower temperatures.

In view of the above disclosure the primary object of the invention is to produce a reliable ECMS that utilizes phase control to apply a soft current start to an inductive and/or a dynamic output load.

In addition to the primary object of the invention it is also an object of the invention to produce an ECMS that:
  limits the in-rush current applied to a load so that "master circuit breakers" are not tripped,
  eliminates the need to install "overrated" circuit breakers and servicing long run conductors,
  reduces electrical consumption by establishing and controlling the upper current limit,
  constantly monitors the electrical current,
  allows a larger load to be installed on a given circuit breaker and conductor combination, and
  is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a combination block diagram and schematic of the electrical current managing system.

BEST MODE FOR CARRYING OUT THE INVENTION

The best mode for carrying out the invention is presented in terms that disclose a preferred embodiment of an electrical current managing system (ECMS) 10. The ECMS 10, which is also referred to as THE CURRENT MASTER™, is designed to utilize a soft current start in combination with "phase control" to set the maximum current draw of an inductive and/or a dynamic load.

The preferred embodiment of the ECMS 10, as shown in FIG. 1, is comprised of the following elements that are attached to a current manager power circuit board 12: an electronic control circuit (ECC) 14, a power control relay 20, a silicon controlled rectifier (SCR) 22, a current adjust circuit 24, a set of system status indicators 26 and a feedback loop 32. The above circuit board-attached elements function in combination with the following circuit board-external elements: an input power source 16, an AC to DC converter 18 or a power transformer 18A, a system activating device 30 and an output load 28.

The current manager power circuit board 12 is located within an enclosure that has a sufficient quantity of heat sinks and circulating air to maintain the circuit board 12 at a safe operating temperature. The power board 12 is also positioned within the enclosure to allow the board to be easily removed for periodic maintenance or repair.

The ECC 14 is designed to centrally operate the ECMS 10. In the preferred embodiment, the ECC 14, as shown in FIG. 1, is applied a system power signal 11, a current adjust signal 13, a system activation signal 15, and an SCR status signal 27. The ECC 14 also produces an SCR activation signal 17, a system status signal 19, and a relay activation signal 21. The ECC 14 is selected from the group consisting of a microprocessor, a microcontroller and can also be designed by a plurality of discrete elements.

The input to the ECMS 10 is provided by an input power source 16 that produces an a-c voltage output that can range from 120 to 600 volts. The output is taken across a first power signal 23 and a second power signal 25, as shown in FIG. 1.

The output from the input power source 16 is applied to either the AC to DC converter 18 or to the power transformer 18A. The AC to DC converter 18 is designed to receive and/to convert the a-c voltage to a regulated d-c voltage that can range from 11 to 13 volts. The regulated d-c voltage is then applied via the system power signal 11 to the ECC 14 where the voltage is distributed to the ECMS 10 elements that are located on the current manager power circuit board 12.

The power transformer 18A is preferably comprised of a high-current, low-voltage, step-down transformer having a primary winding and a secondary winding. The primary winding is applied the a-c voltage from the input power source 16 and the secondary winding produces a system power signal 11 consisting of an a-c voltage ranging from 11 to 13 volts that is applied to the ECC 14. The ECC 14 converts the a-c voltage to a regulated d-c voltage that is applied to the ECMS 10 elements that are located on the current manager power circuit board 12.

The power control relay 20, as shown in FIG. 1, is comprised of a double-pole single-throw (DPST) relay having a pair of normally closed contacts C1 and C2. The coil L1 of the relay 20 is connected to the relay activation signal 21 that is applied from the ECC 14, a first pole P1 connected to the first power signal 23 and that is in contact with a first normally closed contact C1, and a second pole P2 connected to the second power signal 25 and that is in contact with a second normally closed contact C2.

The ECMS 10, as shown in FIG. 1, also functions in combination with a silicon controlled rectifier (SCR) 22, a current adjust circuit 24, a set of system status indicators 26 and a system activating device 30.

The SCR 22, as shown in FIG. 1, is applied the SCR activation signal 17 that is applied from the ECC 14, an SCR input signal 17A that is connected to the first normally closed contact C1 located on the power control relay 20, and an SCR output signal 17B that is connected to the first input 28A on the output load 28.

The current adjust circuit 24 is comprised of a variable resistor such as a potentiometer. The potentiometer is manually set to limit the amount of current that is applied to the output load 28. The circuit 24 prevents a runaway condition that can occur when the circuit attempts to supply unlimited current to the output load 28 which can result in a catastrophic ECMS 10 failure.

The system status indicators are activated by the system status signal 19 that is applied from the ECC 14. The status indicators are typically comprised of a red LED that indicates that the ECMS 10 is experiencing a fault condition, and a green LED that indicates that the ECMS 10 is operable. The indicators can be located on a viewable section of the current manager power circuit board 12, or can be located external to the circuit board 12 on an ECMS structure.

The system activating device 30 is selected from the group consisting of a dry contact sensor such as a moisture sensor, a temperature sensor, a light sensor, a pressure sensor, a time passage sensor and other sensors that are procured to satisfy a particular dry contact application. The particular sensor selected is determined by the function of the output load 28. The device 30 produces the system activation signal 15 which is applied to the ECC 14 for further processing an application.

The output load 28 is connected across a first input 28A and a second input 28B, as shown in FIG. 1. When the system activating device 30 is within a preset threshold level, the ECMS 10 is operable, thereby allowing the first power signal 23 from the input power source 16 to be applied sequentially through the pole P1 of the normally-closed contact C1 of the power control relay 20, the SCR 22 and then to the first input 28A of the output load 28.

The second power signal 25 from the input power source 16 is sequentially applied through the pole P2, the normally-closed second contact C2 of the power control relay 20 and then to the second input 28B on the output load 28. Conversely, when the system activation device 30 is not within the present threshold level, the ECC 14 produces the relay activation signal 21. The signal 21 is applied to the relay coil L1 which then opens the relay contacts C1,C2 disconnecting the output load 28 from the first and second power signals 23,25.

When the system activation signal 15 is applied to the ECC 14, the ECMS 10 becomes operational, allowing the combination of the ECC 14 and the SCR 22 to produce a phase controlled signal. The phase controlled signal ramps upward from zero volts to full power over a two to three second time period. The ramped upward voltage prevents a sudden in-rush of current to be applied to the output load 28 which can result in a catastrophic system failure.

The output load 28 is comprised of a high in-rush current drawing inductive and/or dynamic load. One example of a typical load is a self-regulating cable which has a high in-rush of current draw that is approximately 3 times the rated current per watt. The wattage output, and thus the amperage required of these cables, increases by up to 25% as the ambient temperature drops from 50 to 0 degrees Fahrenheit. Without the use of the ECMS 10, the distribution panel breaker and the gauge of the conductors must be oversize to accommodate the in-rush of current necessary for operation particularly at lower temperatures.

The ECMS 10 can also be designed to function with a feedback loop 32 which produces the SCR status signal 27 that is applied from the output of the SCR 22 to the ECC 14, as shown in FIG. 1. If the ECC 14 removes the SCR activation signal 17 the SCR will turn "off", thus removing the power applied to the output load 28 and no power will be present on the SCR status signal 27 applied to the ECC 14. Conversely, if the ECC 14 applies the SCR activation signal 17, the SCR 22 will turn "on", causing the SCR status signal 27 to be applied to the ECC 14 for processing.

The feedback loop 32 is utilized to inform the ECC 14 of the state or condition of the SCR 22:

Condition A: If the SCR 22 is supposed to be "off" and there is a voltage present on the SCR status signal 27, the SCR 22 is shorted.

Condition B: If the SCR 22 is supposed to be "on" and there is no voltage present on the SCR status signal 27, the SCR 22 is open.

If either of the conditions A or B exist, the FCC 14 recognizes that there is a fault on the ECMS 10 and the FCC 14 would then activate and apply the relay activation signal 21 to the coil L1 of the power control relay 20. The activated relay 20 will open the contacts C1,C2, thus removing power to the output load 28.

Under a fault condition the ECC 14, in addition to removing power to the output load 28, will also turn "off" the green LED and turn "on" the red LED, indicating that an ECMS circuit fault has occurred.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. An electrical current managing system (ECMS) comprising:
    a) an electronic control circuit (ECC) having means for controlling the operation of said ECMS,
    b) a system activating device having means for producing a system activation signal,
    c) a power control relay having a first pole that interfaces with a first normally closed contact, a second pole that interfaces with a second normally closed contact, and a coil that is connected to a relay activation signal applied from said ECC,
    d) an input power source that produces a utility a-c voltage,
    e) an AC to DC converter having an input that is applied the a-c voltage from said input power source, and an output that produces a regulated d-c voltage that is applied to said ECC from where the power is distributed to the elements comprising said ECMS,
    f) an output load having a first input and a second input,
    g) a silicon controlled rectifier (SCR) that is applied an SCR activation signal from said ECC, an SCR input signal applied from the first normally-closed contact on said power control relay, and an SCR output signal that is connected to the first input on said output load, wherein the second input on said output load is applied directly from the second normally-closed contact of said power control relay, wherein when the system activation signal is applied to said ECC, said ECMS becomes operational, thereby allowing the combination of said ECC and said SCR to produce a phase controlled voltage that ramps upward from zero volts to full power over a two to three second time period, wherein the ramped voltage prevents a sudden in-rush of current to be applied to said output load, conversely when the system activation signal is not applied, said ECC produces a relay activation signal that is applied to the coil of said power control relay which energizes the relay, allowing the relay contacts to open causing said output load to disconnect,
    h) a current adjust circuit that produces a current adjust signal that is applied to said ECC, wherein said current adjust circuit includes a potentiometer that is manually set to limit the amount of current applied to said output load,
    i) a set of system status indicators that are activated by a system status signal produced by said ECC, and
    j) a feedback loop connected from the SCR output signal to said ECC, wherein said feedback loop produces an SCR status input signal that is applied to and processed by said ECC.

2. The ECMS as specified in claim 1 wherein said system activating device is selected from the group consisting of a moisture sensor, a temperature sensor, a light sensor, a pressure sensor and a timer.

3. The ECMS as specified in claim 1 wherein said output load is comprised of a self-regulating cable, or a high in-rush current drawing inductive or dynamic load.

4. An electrical current managing system (ECMS) comprising:
    a) an electronic control circuit (ECC) (14) that is applied a system power signal (11), a current adjust signal (13), a system activation signal (15), and an SCR status signal (27), wherein said ECC also produces an SCR activation signal (17), a system status signal (19), and a relay activation signal (21),
    b) an input power source (16) that produces a first a-c power signal (23) and a second a-c power signal (25),
    c) a power transformer (18) having a primary winding connected across the first a-c power signal (23) and the second a-c power signal (25), and a secondary winding that produces the system a-c power signal (11) that is applied to said ECC (14), wherein the a-c voltage is converted to a regulated d-c voltage that is distributed to the elements that comprise said ECMS (10),
    d) a power control relay (20) comprising: a coil (L1) connected to the relay activation signal (21), a first pole (P1) connected to the first power signal (23) and that is in contact with a first normally closed contact (C1), a second pole (P2) connected to the second power signal (25) and that is in contact with a second normally-closed contact (C2),
    e) a silicon controlled rectifier (SCR) (22) that is applied the SCR activation signal (17) applied from said ECC (14), an SCR input signal (17A) connected to the first normally closed contact (C1) On said power control relay (20), and an SCR output signal (17B),
    f) a current adjust circuit (24) that produces the current adjust signal (13) applied to said ECC (14),
    g) a system activating device (30) that produces the system activation signal (15), applied to said ECC (14), and
    h) an output load (28) having a first input (28A) connected to the SCR output signal (17B), and a second input (28B) applied directly from the second contact (C2) on said power control relay (20), wherein when said system activating device (30) is within a preset threshold level, said ECMS (10) is operable, thereby allowing the first power signal (23) from said input power source (16) to be sequentially applied through the pole (P1), the normally-closed contact (C1) of said power control relay (20), said SCR (22) and then to the first input (28A) of said output load (28), wherein the second power signal (25) from said input power source (16) is sequentially applied through the pole P2, the normally-closed second contact (C2) of said power control relay, and then to the second input (28B) on said output load (28), conversely, when said system activation device (30) is not within the preset threshold level, said ECC produces the relay activation signal (21) which is applied to the coil (L1) of the power control relay (20) which then opens the relay contacts (C1,C2) disconnecting said output load (28) from the first and second power signals (23,25), wherein when the system activation signal (15) is applied to said ECC (14), the ECMS (10) becomes operational, thereby allowing the combination of said ECC (14) and said SCR (22) to produce a phase controlled voltage that ramps upward from zero volts to full power over a two to three second time period, wherein the ramped voltage prevents a sudden in-rush of current to be applied to said output load (28), i) a feedback loop (32) connected from the SCR output signal to said ECC wherein said feedback loop produces the SCR status input signal (27) that is applied to and processed by said ECC, and j) a current manager power circuit board (12) that has attached said ECC, said power control relay, said SCR, said current adjust circuit, and said system status indicators.

5. The ECMS as specified in claim 4 wherein said system activating device is selected from the group consisting of a moisture sensor, a temperature sensor, a light sensor, a pressure sensor, and a timer.

* * * * *